US010931373B2

(12) United States Patent
Maierbacher et al.

(10) Patent No.: US 10,931,373 B2
(45) Date of Patent: Feb. 23, 2021

(54) WIRELESS COMMUNICATION LINK BETWEEN AT LEAST ONE COMMUNICATION TERMINAL DEVICE POSITIONED IN A PREDETERMINABLE REGION AND A COMMUNICATION NETWORK

(71) Applicant: OSRAM GmbH, Munich (DE)

(72) Inventors: Gerhard Maierbacher, Munich (DE); Alexander Wanderer, Dachau (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/609,214

(22) PCT Filed: May 16, 2018

(86) PCT No.: PCT/EP2018/062799
§ 371 (c)(1),
(2) Date: Oct. 29, 2019

(87) PCT Pub. No.: WO2018/219656
PCT Pub. Date: Dec. 6, 2018

(65) Prior Publication Data
US 2020/0083957 A1 Mar. 12, 2020

(30) Foreign Application Priority Data
May 31, 2017 (DE) .................... 10 2017 209 103.7

(51) Int. Cl.
H04B 10/114 (2013.01)
H04B 10/112 (2013.01)
(Continued)

(52) U.S. Cl.
CPC ........ *H04B 10/1123* (2013.01); *H04W 76/10* (2018.02); *H05B 47/19* (2020.01); *H04B 10/502* (2013.01); *H04B 10/61* (2013.01)

(58) Field of Classification Search
CPC .......................................... H04B 10/114–116
See application file for complete search history.

(56) References Cited

U.S. PATENT DOCUMENTS

2010/0209105 A1* 8/2010 Shin .................. H04B 10/1149
398/58
2012/0001567 A1 1/2012 Knapp
(Continued)

FOREIGN PATENT DOCUMENTS

DE 102004040837 A1 3/2006
EP 0355952 A2 2/1990
(Continued)

OTHER PUBLICATIONS

Grobe et al.; "High-Speed Visible Light Communication Systems"; IEEE Communications Magazine; Dec. 2013; 8 pages; IEEE Service Center.
(Continued)

*Primary Examiner* — Shi K Li
(74) *Attorney, Agent, or Firm* — Viering, Jentschura & Partner MBB

(57) ABSTRACT

A wireless communication link between a communication network and a communication terminal device positioned in a predeterminable region may be established and improve capacity for wireless communication. A line-bound communication link to the communication network may be established via a communication base device arranged in a fixed location, and an optically-based communication link to the communication terminal device may be established via an optical deflection device.

13 Claims, 8 Drawing Sheets

(51) Int. Cl.
*H04W 76/10* (2018.01)
*H05B 47/19* (2020.01)
*H04B 10/50* (2013.01)
*H04B 10/61* (2013.01)

(56) References Cited

U.S. PATENT DOCUMENTS

| | | | | |
|---|---|---|---|---|
| 2013/0101285 A1* | 4/2013 | Shar | H04B 10/1149 | |
| | | | | 398/38 |
| 2016/0173199 A1* | 6/2016 | Gupta | H04B 10/1149 | |
| | | | | 398/127 |
| 2018/0176731 A1* | 6/2018 | Hashisho | G01S 5/0036 | |
| 2018/0267249 A1* | 9/2018 | Yamaguchi | G02B 27/0977 | |

FOREIGN PATENT DOCUMENTS

| | | |
|---|---|---|
| EP | 1858179 A1 | 11/2007 |
| EP | 2587694 A1 | 5/2013 |
| WO | 9213402 A1 | 8/1992 |
| WO | 0103242 A1 | 1/2001 |
| WO | 2006046087 A1 | 5/2006 |

OTHER PUBLICATIONS

Duan et al.: "A Practical Indoor Visible Light Communication System"; 9th International Symposium on Communication Systems, Networks & Digital Sign (CSNDSP); 2014; 6 pages.

Karunatilaka et al.; "LED Based Indoor Visible Light Communications: State of the Art"; IEEE Communication Surveys & Tutorials; Third Quarter 2015; vol. 17, No. 3; 28 pages.

Elgala et al.; "Indoor Optical Wireless Communication: Potential and State-of-the-Art"; IEEE Communications Magazine; Sep. 2011; 8 pages.

German Search Report based on Application No. 10 2017 209 103.7 (12 pages) dated Jun. 4, 2018 (for reference purpose only).

International Search Report based on Application No. PCT/EP2018/062799 (16 pages) dated Jul. 4, 2018 (for reference purpose only).

* cited by examiner

WIRELESS COMMUNICATION LINK BETWEEN AT LEAST ONE COMMUNICATION TERMINAL DEVICE POSITIONED IN A PREDETERMINABLE REGION AND A COMMUNICATION NETWORK

CROSS-REFERENCE TO RELATED APPLICATIONS

The present application is a national stage entry according to 35 U.S.C. § 371 of PCT application No. PCT/EP2018/062799 filed on May 16, 2018; which claims priority to German Patent Application Serial No.: 10 2017 209 103.7, which was filed on May 31, 2017; both of which are incorporated herein by reference in their entirety and for all purposes.

TECHNICAL FIELD

The present invention relates to a communication base device for a communication link for providing a wireless communication link between at least one communication terminal device positioned in a predeterminable region and a communication network. The communication device may provide a wireless communication link between at least one communication terminal device positioned in a predeterminable region and a communication network, and more specifically where the communication base device is fixedly arranged and is connected to the communication network.

BACKGROUND

Communication base devices, communication devices, methods for the operation thereof, and also methods for establishing wireless communication links are extensively known in principle in the prior art, so that separate documentary evidence is not required for this purpose. They are used to establish a communication link between the communication terminal device and the communication network, so that data can be transmitted, e.g. to the communication network. A WLAN router is generally provided for this purpose in the prior art.

The communication terminal device may be a mobile communication terminal device that may include a wireless communication link to the communication base device. Such a communication terminal device can be, for example, a smart phone, a tablet computer, a PDA, and/or the like. In addition, the communication terminal device can also be a computer, however, for example, a personal computer (PC), e.g. a desktop PC, but also a laptop or the like.

With the increasing requirement of being able to implement high data rates, and the increasing usage of available services, a high level of growth is to be expected, e.g. in mobile data rates. The available technologies, e.g. based on the WLAN standard, can only contribute to a very limited extent thereto or have partially already encountered technical capacity limits. In the field of mobile wireless, it is already routine in this regard to provide additional base stations and distribute them more finely. However, this requires a high technical and financial expenditure.

Not only, but especially in the field of buildings, for example, in existing buildings, retrofitting may be implemented, which requires the laying of corresponding wired communication paths, for example, based on ethernet or the like. In new buildings, in addition, new technologies can also be used, for example, power-over-ethernet or the like, in which both electrical energy and also data can be transmitted over only a single line connection. However, these options require a high additional technical and financial expenditure and can sometimes only be used to a limited extent. Further need for improvement therefore still remains.

SUMMARY

It is desirable to further improve the capacity for wireless communication.

With respect to a communication base device, it is proposed that the communication base device includes a light-based communication unit for providing a wireless light-based communication link to a light deflection unit deflecting light between the communication base device and the predeterminable region, and a converter unit for the communication coupling of the communication unit to the network connection.

With respect to a communication device, it is proposed that it includes at least one communication base device and at least one light deflection unit for deflecting light between the communication base device and the predeterminable region, wherein the light deflection unit is in a fixed positional relationship to the communication base device.

A method for providing the wireless communication link with a light deflection unit deflecting light between the communication base device and the predeterminable region be arranged, wherein the light deflection unit is in a fixed positional relationship to the communication base device, a wireless light-based communication link to the light deflection unit by means of a light-based communication unit is provided to the communication base device, and the communication unit is coupled with respect to communication to the communication network.

Furthermore, a fixedly arranged communication base device may establish a wired communication link to the communication network and may establish a light-based communication link via a light deflection unit to the communication terminal device, wherein the light deflection unit is in a fixed positional relationship to the communication base device and deflects light between the communication base device and the predeterminable region.

Wireless communication may be enhanced in a simple manner, e.g. by changing over from the heretofore typical radio-based wireless communication to a now light-based wireless communication, or by supplementing a radio-based wireless communication with a light-based wireless communication. At the same time, a simple option for equipping is provided by the devices, e.g. the communication device, in conjunction with the communication base device, which can moreover be installed easily in existing buildings, and to establish and/or improve a wireless communication link. Due to the use of the wireless light-based communication, it is possible with higher channel capacity of communication channels to substantially avoid an additional installation of lines. The devices and methods are also suitable for retrofitting in existing buildings in non-limiting embodiments. Of course, the devices and methods are not restricted to use in buildings, but rather can also be utilized, inter alia, in open terrain, for example, in public places, in event areas, and/or the like. In this case, the particularly simple equipping because of the required technical devices, which are kept simple, has proven to be particularly advantageous, so that a construction limited with respect to time can be implemented with little effort. No additional wired connections have to be laid to be able to achieve the improved capacity with respect to the wireless communication.

The communication base device may include a device or a unit which is capable of data exchange with the communication terminal device. The communication base device can thus in the simplest case also be a communication terminal device, as was previously explained, or also a PC or the like. In addition, however, the communication base device can also be another data-processing unit, for example, it may include a storage unit for storing data and/or the like. In non-limiting embodiments, the communication base device includes a network connection for connecting the communication base device to the communication network. The communication base device is thus coupled with respect to communication to the communication network. The communication network can be, for example, a regional or also a trans-regional communication network, for example, an intranet, the Internet, and/or the like.

The light-based communication link can use, for example, visible light, but also infrared light, ultraviolet light, combinations thereof, and/or the like as the medium for data transmission. The communication base device includes a light-based communication unit, which is used to provide a wireless light-based communication link to a light deflection unit deflecting light between the communication base device and the predeterminable region.

The light deflection unit is provided to deflect the light into the predeterminable region, in that the communication terminal device can use the light-based communication link by means of a suitable light-based independent communication unit. The light deflection unit may be arranged in optical field of view with respect to the light-based communication unit of the communication base device. The light-based communication link can be designed for close-range communication according to Li-Fi (light fidelity) or the like. In non-limiting embodiments, the light-based communication link can use a method for optical data transmission over short distances (Optical Wireless Communication, OWC, or also Visible Light Communication, VLC) or also an optical equivalent to WLAN, which is implemented by radio technology.

The light deflection unit may be a passive light deflection unit, which deflects the light received and/or supplied from the communication unit of the base station into the predeterminable region. For this purpose, the light deflection unit may include suitable light-diffracting means. The light-based communication unit of the communication base device is designed to modulate the light which it emits to the light deflection unit in accordance with data to be transmitted.

In addition, the light deflection unit is designed to deflect light transmitted from the communication terminal device to the communication base device from the predeterminable region in a suitable manner to the communication base device, e.g. to its light-based communication unit. The light-based communication unit of the communication base device is thus designed to detect light received from the light deflection unit and to ascertain the data transmitted using the light.

To now establish the communication coupling to the communication network by means of the communication base device, the communication base device includes the converter unit, which establishes the bidirectional communication coupling between the light-based communication unit and the network connection in a non-limiting embodiment. The converter unit may be an electronic module, which can be designed, for example, as a hardware circuit and/or also as a program-controlled processor unit. In this manner, it is possible to couple the light-based optical communication link for communication to the communication network.

The predeterminable region is a region which can be determined by properties of the light deflection unit. Light supplied by the light-technology communication unit of the communication base device can be deflected by the light deflection unit into the predetermined region. A reliable communication based on light technology can thus be established with the communication base device by means of the communication terminal device, which is, for example, a mobile and/or portable device, by positioning the communication terminal device within the predeterminable region. The predeterminable region can be defined, for example, by a predeterminable spatial angle, into which the light supplied by the communication base device is deflected by means of the light deflection unit.

It can be provided in this case that the light supplied by the communication base device is emitted by the light deflection unit into the predeterminable region diverging in accordance with the predeterminable region and/or its extension.

The light deflection unit may include as light-diffracting means, for example, reflective and/or refractive elements, for example, mirrors, lenses, prisms, but also possibly filter elements, for example, polarization filters or the like. In the simplest case, the light deflection unit can be formed by a mirror unit, which is arranged at a suitable point, so that the supplied light can be deflected into the predetermined region.

The light deflection unit may be arranged within a floor of the predeterminable region, so that the light deflected by the light deflection unit is deflected at least partially in the direction of the floor. The light deflection unit may be arranged on a ceiling of a room, which includes and/or forms the predeterminable region.

The light deflection unit is in a fixed relationship to the communication base device, which can be determined by the spatial conditions with respect to the light-based coupling. The light propagation from the light deflection unit into the predeterminable region can thus also be influenced.

The predeterminable region can be formed from one or more subregions, which can at least partially overlap. The subregions can also be at least partially separated from one another. The predeterminable region can thus be determined, for example, by a light deflection unit which includes, for example, multiple light deflection elements, which can pre-determine and/or determine a respective subregion. The predeterminable region may be a coherent region, however, in which the communication terminal device can be positioned as desired to be able to provide the light-based communication to the communication base device.

The predeterminable region can thus be determined, inter alia, by the arrangement and/or the position of the light deflection unit. The predeterminable region can also be determined, for example, by a light which illuminates the predeterminable region. In this case, the light deflection unit may be mechanically coupled to the light. It is thus immediately apparent to a user of the communication device how far the predeterminable region extends, so that he can select his whereabouts suitably for the predeterminable region, in order to be able to ensure a reliable communication link to the communication base device.

The light deflection unit can additionally also be brought into a desired position by means of positioning means, for example, a ceiling of a room, a mast, and/or the like, so that the predeterminable region can be reached in a desired manner.

The light deflection unit may be arranged in an optical field of view in relation to the communication base device, so that a data transmission can be provided via the wireless light-technology communication link. Laying of cables or the like thus does not have to be provided to implement the communication link. In addition, a power supply also does not have to be provided for the light deflection unit, because the light deflection unit may be designed as a passive light deflection unit, which does not have to include separate setting devices and transducer devices. The light deflection unit can therefore be arranged nearly arbitrarily without consideration having to be taken of a power supply.

The light deflection unit may include a separate housing or also an installation frame or the like. However, it may be equipped only with a fastening means in a non-limiting embodiment, which permits the light deflection unit to be fastened on or in a room, for example, the ceiling or an upper region of a wall, and/or integrated therein. The fastening means can be formed, for example, by a fastening tab, which can be mechanically connected using a clip and/or a screw or the like to the corresponding wall element or the ceiling, respectively. Furthermore, the fastening means may include an adhesive bond, which can be formed, for example, by means of an adhesive, e.g. an adhesive tape or the like. In addition, it can be provided that the light deflection unit is formed by properties of a delimitation wall of the room, for example, a wall or a ceiling of the room which encloses the predeterminable region.

The network connection of the communication base device may be a wired connection for a communication link to the communication network. The network connection can be formed, for example, by a plug connection, which may be designed as detachable. In non-limiting examples, the network connection is designed as an electrical connection. It can be designed, for example, for an ethernet connection or the like. In addition, of course, the network connection can also be designed as an optical network connection to be able to connect the communication base device, for example, to an optical communication network, for example, by means of a glass fiber cable or the like. Combinations thereof can also be provided, of course. Depending on the type of the network connection, the converter unit is designed accordingly, so that a communication coupling to the communication network can be achieved.

The communication unit can also be designed as an electronic circuit. It is used to convert data and/or signals corresponding to the data, which are provided by the converter unit, into suitable light-technology signals and to emit the light modulated in this way in such a manner that it can be deflected by the light deflection unit into the predeterminable area. In addition, the communication unit is designed to receive light supplied by the light deflection unit from the predeterminable area and to ascertain the data contained therein and transmit the data to the converter unit.

The communication base device may also be arranged in an upper region of a room, which includes the predeterminable region, for example, in an upper region of a wall of the room or also on a ceiling as well, so that a substantially undisturbed light-based communication link can be provided between the communication base device and the light deflection unit. However, it can also be provided that the communication base device is arranged, for example, on a mast, a pillar, or also on another component in a suitable manner, so that a substantially undisturbed light-based communication link to the light deflection unit can be implemented. The other component can be, for example, a stationary piece of furniture, for example, a sideboard, a conference table, a standing light, or a lighting unit in the nature of a ceiling floodlight. Furthermore, the communication base device can also be arranged on the floor of the room, e.g. in a floor tank.

The devices and methods may be used in closed rooms of buildings, for example, in halls, conference rooms, and/or the like. In addition, however, the devices and methods can similarly also be used in predetermined outside regions. For example, this can be implemented in waiting areas in railway stations or the like. The communication base device can be positioned, for example, on an outer wall of a railway station building or the like, so that an undisturbed light-based communication link can be implemented.

Because of the wireless light-based communication link and/or the physical properties of this communication link, very high data rates can be achieved. It is thus possible to provide a communication link having a high data rate not only to one single communication terminal device, but rather also if a plurality of communication terminal devices is to be connected. In addition more than one light deflection unit may be coupled by light technology and in this manner to provide a quasi-separate communication network in a room.

Of course, it can be provided that a separate communication base device assigned thereto is provided for each light deflection unit. However, it has proven to be particularly advantageous if multiple light deflection units can jointly use one communication base device, such as if it is used for the connection to the communication network. The communication base device can be designed as a gateway or may include a gateway in this context, for example. In addition, of course, it is also possible that multiple communication base devices are provided, of which at least two jointly use one light deflection unit.

It is furthermore proposed that the communication unit is designed to emit and/or receive light in a predetermined light frequency range individually assigned to the communication terminal device. In non-limiting embodiments, the light can be emitted and/or received having a color individually assigned to the communication terminal device. Not only can a particularly secure, e.g. interference-secure, wireless communication link thus be achieved, but rather this additionally also permits multiple communication terminal devices to be able to be coupled to the communication base device and/or vice versa, such as using independent light-based communication links. The communication base device can thus make a selection by communication in the respective light frequency range with which of the communication terminal devices it maintains the communication link. In principle, of course, this can also be provided in reverse if, for example, one communication terminal device maintains the light-based communication link to more than one single communication base device. It can then be provided here that the communication base device is selected accordingly by selection of the respective light frequency range by the communication terminal device. This embodiment also proves to be advantageous, inter alia, if communication base devices are used as relay stations to be able to couple further light deflection units with respect to communication, which would otherwise not be in communication range, for example, because a wireless light-based communication link is not possible as a result of obstacles or the like. Multiple light frequency ranges can also be provided if needed, which may not overlap in a non-limiting embodiment.

The communication unit may include an optical emitter element, which is designed to emit the light in an oriented manner to provide the wireless communication link. The emitter element may include a suitable light source for this purpose, which can be modulated in accordance with the data to be transmitted, for example, a light-emitting diode, a laser diode, combination circuits thereof, or the like. In addition, the emitter element may also include optical elements, for example, a mirror, a prism, a lens, an optical filter, combinations thereof, or the like. It is thus possible to emit the light in the direction of the light deflection unit, so that it is available as completely as possible for the wireless communication link. Regions which are not positioned in the direction of the light deflection unit thus do not have to be subjected to the light of the emitter element.

In addition, it is proposed that the communication unit be designed to orient the optical emitter element and/or an optical receiver element of the communication unit onto the light deflection unit, such as automatically. This refinement has proven to be particularly advantageous for the installation of the communication device as a system. For example, if light deflection units are arranged later and one or more corresponding communication base devices are installed, it can be that a spatial angle is to be set, e.g. because of a respective arrangement, so that the light-based communication link to the light deflection unit and then also to the predeterminable region can be established. For this purpose, one or more mechanically movable setting elements or also a mechanically movable communication unit can be provided. In non-limiting embodiments, the emitter element and/or the receiver element can be correspondingly settable. It has proven to be particularly advantageous if the communication base device includes a control unit, which permits it to execute the orientation at least partially automatically. It can thus be provided, for example, that a spatial angle is predetermined, which is then implemented by automated setting of the communication unit, e.g. of the emitter element and/or the receiver element. An indicator signal with respect to a signal and/or channel quality or the like, for example, the quality of the provided communication link, can be used for the orientation, for example, for an assistance of the alignment and/or orientation during the installation. The optical receiver element can be formed, for example, by a photodiode, a photoresistor, a phototransistor, a solar cell, and/or by another suitable photosensitive component.

The communication unit is advantageously designed to focus the emitted light on a predeterminable area. The predeterminable area is to be differentiated from the predeterminable region and may be determined by a position of the light deflection unit or at least includes it. The communication unit may emit its light into the predeterminable area. The utilization of the light emitted by the communication unit can thus be further improved. If the light deflection unit includes multiple light deflection elements, the predeterminable region can be determined in such a way that all light deflection elements are acquired. Therefore, all light deflection elements can be subjected to light emitted by the communication unit.

In addition, it is proposed that the communication unit is designed to emit the light in multiple light frequency ranges different from one another and to focus the light of a respective light frequency range onto an associated one of multiple subareas of the predeterminable area. The predeterminable area may include multiple subareas which can be individually assigned respective light deflection elements of the light deflection unit. The subareas can spatially overlap or can be separate from one another. It is thus possible to provide the light-based communication link specifically by light deflection element.

The communication unit may be designed to emit the light into predeterminable subareas of the predeterminable area. It is thus possible to provide communication areas spatially separate from one another, in which a communication is enabled independently of one another. The communication unit may include for this purpose, for example, correspondingly assigned and oriented emitter and/or receiver elements.

It is furthermore proposed that the communication unit is designed to provide a respective separate individual communication channel for each of a predetermined plurality of communication terminal devices. The communication channel is based on the light-based communication link and is used to establish an individual, e.g. bidirectional, wireless communication link between the communication terminal device of the user and the communication base device. For this purpose, a frequency multiplexing method, a time multiplexing method, a code multiplexing method, a space multiplexing method, a wavelength/color multiplexing method, combinations thereof, or the like can be provided, in which multiple signals can be combined and/or bundled and can be transmitted simultaneously via a medium, the light-based communication link here. In a time multiplexing method, for example, repeating time windows can be provided, which are individually assigned to the respective communication channel.

In addition, of course, the option also exists that each communication channel includes a predeterminable light frequency range of the light-based communication link. The light frequency range may be individually assigned to the respective communication channel. A substantially undisturbed individual communication can thus be implemented between the communication terminal device and the communication base device, even if further communication terminal devices and/or communication base devices communicate with one another simultaneously. Due to the communication channels, the communication can thus be operated substantially independently of one another. The assignment of one communication channel or multiple communication channels can initially be performed by a manual setting or also automatically, for example, by the communication base device transmitting a respective light frequency range or communication channel to the communication terminal device or the like.

It is furthermore proposed that the light deflection unit includes an orientation unit, so that the light deflection unit is oriented, e.g. automatically, in such a way that light is deflected into the predetermined region. For this purpose, the orientation unit may include one or more positioning elements, which enable a corresponding orientation of the light deflection unit. The orientation may include both positioning and orientation of the light deflection unit in relation to the predeterminable region and also a translational displacement, a setting of diffraction elements with respect to the light to be deflected, and/or the like. The diffraction properties may also include scattering of the light. A high level of flexibility with respect to the implementation of the predeterminable region can thus be achieved, so that the desired wireless communication link can be implemented with low expenditure.

The light deflection unit may include at least one reflector element. The reflector element can be formed by a mirror or a surface which has corresponding optical reflection properties. The reflector element can also be formed by a coating, which is applied, for example, to a wall of a room in which the predeterminable region is arranged, for example, to a ceiling or the like. Of course, the coating can also only be applied partially to the wall or the ceiling, respectively. Multiple reflector elements can also be provided if needed, which interact in a suitable manner so that the predeterminable region can be reached. The light deflection unit can thus be adapted to the predeterminable region using the reflector element. In addition, of course, refractory elements such as lenses, prisms, combinations thereof, and/or the like can additionally be provided.

It has proven to be particularly advantageous if the at least one reflector element is integrally formed with a delimitation wall of a room which at least partially includes the predeterminable region. The delimitation wall can be a suitable wall of the room, which at least partially delimits the room with respect to its extension. The delimitation wall can be, for example, a ceiling, at least one side wall, a floor, combinations thereof, or the like. The reflector element can be fastened by means of mechanical fastening options in at least one region of the delimitation wall in a predeterminable manner, for example, by means of a mechanical connection technology such as screws, rivets, adhesive bonding, welding, and/or the like. In addition, however, the reflector element can also be formed by the coating, which is applied to the delimitation wall in at least one area thereof, for example, by means of painting, spraying, and/or the like. The reflector element can thus be integrally connected to structural elements already provided in any case and/or integrated therein, so that the expenditure can be reduced overall.

According to one refinement, it is proposed that the light deflection unit includes at least one spectral filter element. It is thus possible to improve the light-based communication link with respect to interference due to ambient light. Interfering light influences can thus be reduced by the filter element. The filter element can be formed for this purpose by a transparent suitable element, which provides a corresponding spectral filter action, for example, a color wheel or the like. In addition, the filter element can also be formed by a polarization filter element. A selection with respect to the light to be deflected can thus be achieved.

The advantages and effects indicated for the communication base device apply similarly to the communication device and also to the methods and vice versa. Method features can thus also be worded as device features and vice versa.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

Figure 1:
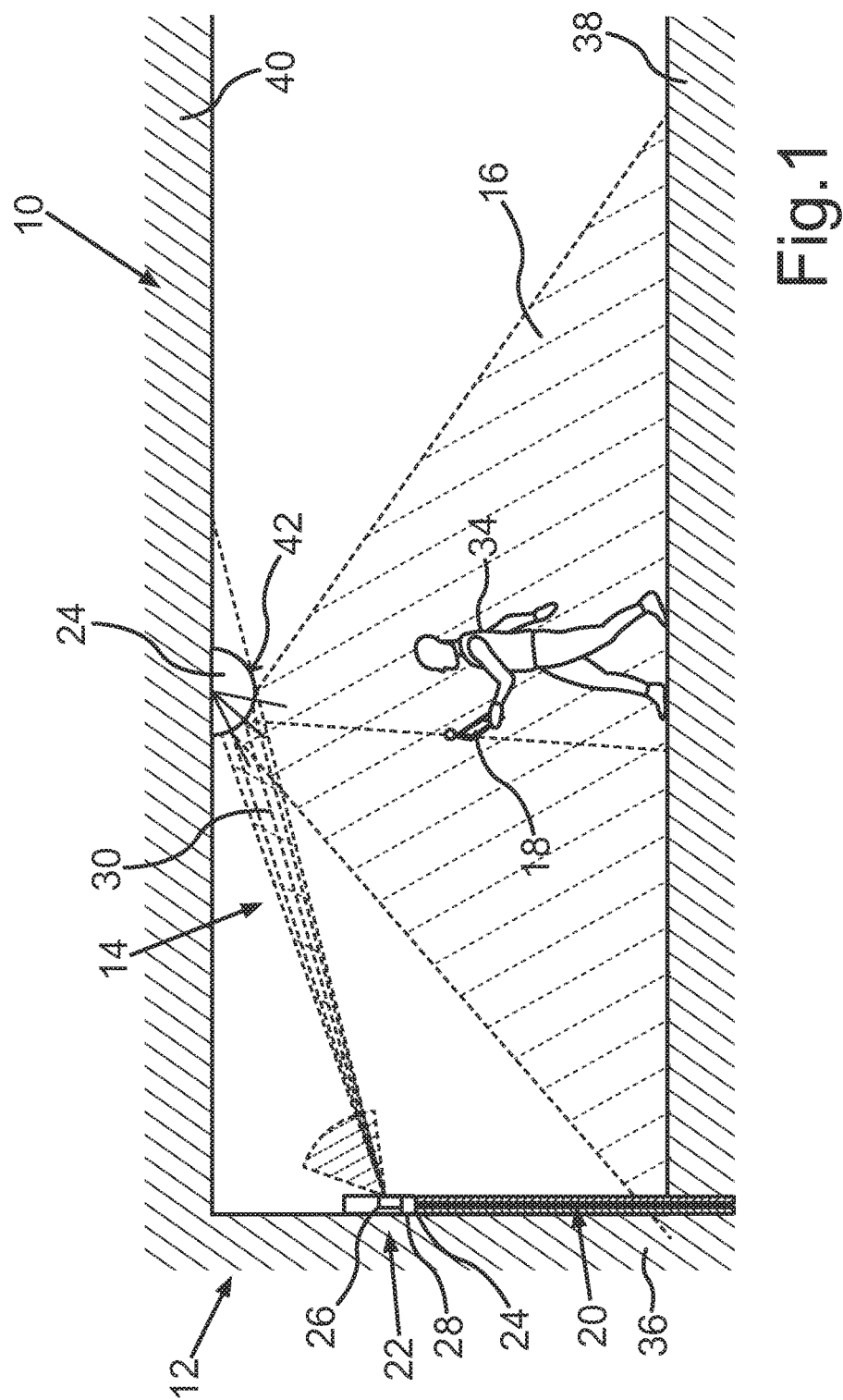
FIG. 1 shows a schematic illustration of a communication device.
Figure 2:
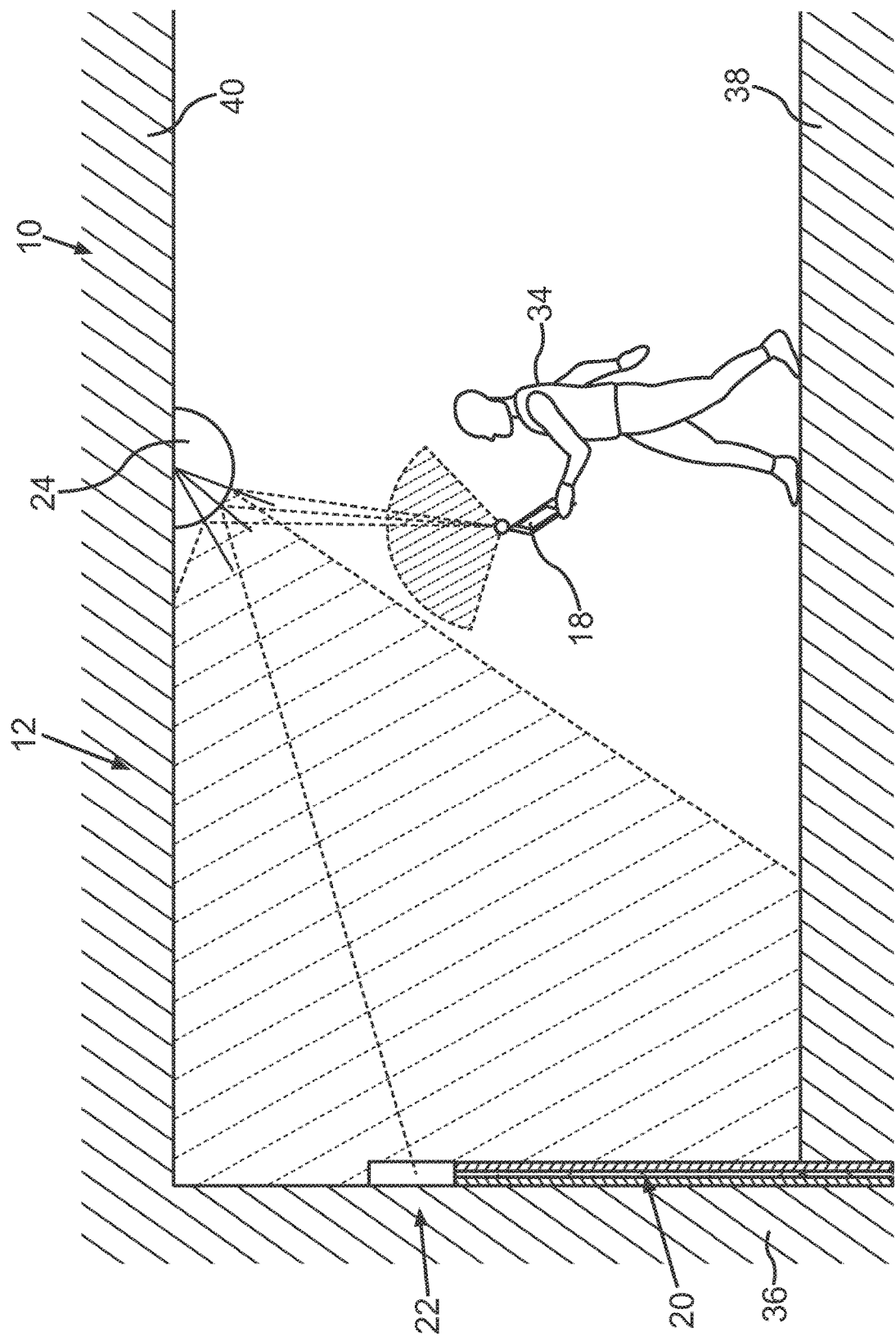
FIG. 2 shows a schematic illustration as in FIG. 1, in which a light link of the light-based communication link from a mobile wireless terminal device of the user to the communication base device is shown.

FIG. 1 shows a schematic illustration of a room 10 having a communication device 12. The room 10 includes a ceiling 40, which borders on a side wall 36, which in turn borders on a floor 38, which is opposite to the ceiling 40.

The communication device 12 is used to provide a wireless communication link 14 between a communication terminal device 18 positioned in a predeterminable region 16 and a communication network 20. In the present case, the communication network 20 is an intranet, which is formed in a building (not shown in greater detail), to which the room 10 belongs. Only corresponding connecting lines are identified with the reference sign 20 in FIG. 1. The predeterminable region 16 is completely comprised by the room 10.

The predeterminable region 16 is selected in such a way that a user 34 who carries the communication terminal device 18 can use the wireless communication link 14. In the present case, the communication terminal device 18 is formed by a smart phone. However, it can also be formed by another communication terminal device.

The communication device 12 includes a fixedly arranged communication base device 22, which is fastened in the present case in an upper region of the side wall 36 of the room 10. In addition, the communication device 12 includes a light deflection unit 24, which is used for deflecting light between the communication base device 22 and the predeterminable region 16. The light deflection unit 24 is arranged in a fixed positional relationship to the communication base device 22, in the present case on the ceiling 40 of the room 10. In the present case, the light deflection unit 24 includes a convex mirror 42 as a reflector element, which is formed hemispherical and is fastened on the ceiling 40 with its spherical cap protruding into the room. A curvature of the spherical cap of the convex mirror 42 and a distance between the communication base device 22 and the convex mirror 42 is selected in such a way that the communication link 14 acquires the predetermined region 16.

The communication base device 22 is used for providing the wireless communication link 14 between the communication terminal device 18 positioned in the predeterminable region 16 and the communication network 20. For this purpose, the communication base device 22 includes a network connection 28, which is connected to the communication network 20. In addition, the communication base device 22 includes a light-based communication unit 26, which is used to provide a wireless light-based communication link 30 to the light deflection unit 24. Furthermore, the communication base device 22 includes a converter unit 28, by means of which the communication unit 26 is coupled with respect to communication to the network connection 28.

The communication unit 26 is designed to emit and receive light in a predetermined light frequency range individually assigned to the communication terminal device 18. An individual communication channel is thus provided, so that the possibility is provided that the communication base device 22 can communicate with multiple different communication terminal devices, such as the communication terminal device 18, independently of one another. In this case, a respective individual communication channel is assigned to each of the communication terminal devices 18. If a number of light frequency ranges should no longer be sufficient to be able to provide a respective individual communication channel for each of the communication terminal devices 18, it can additionally be provided that respective light frequency ranges are used in the manner of a multiplexing method such as a time multiplexing method to be able to provide further independent communication channels in this manner.

In the present embodiment, it is provided that the predeterminable region 16 can be subjected to light from the communication base device 22 and/or the communication unit 26 from above by the light deflection unit 24. Shadows can thus be substantially avoided.

Figure 3:
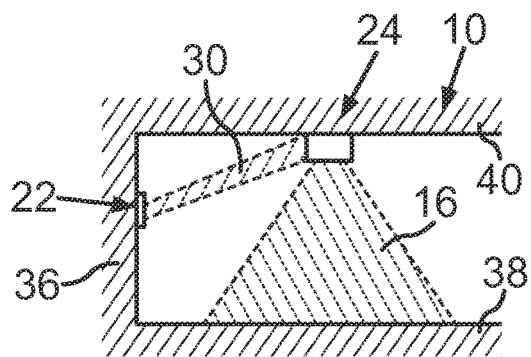
FIGS. 3 to 9 show schematic illustrations of further embodiments of communication devices as in FIG. 1, FIGS. 10 to 13 show schematic illustrations of different light deflection units for communication devices.

FIGS. 3 to 9 illustrate different embodiments of the communication base device 22. FIG. 3 shows a communication base device 22, which is arranged on a side wall 36 of the room 10 as in FIG. 1. The communication unit 26 of the communication base device 22 provides a narrow, well-focused light beam to the light deflection unit 24, which deflects this light into the predeterminable region 16. Accordingly, the communication unit 26 includes suitable light sources, for example, light-emitting diodes, laser diodes, and/or the like, such as in conjunction with light-focusing elements. A good light utilization can be achieved for the communication medium in this way.

Figure 4:
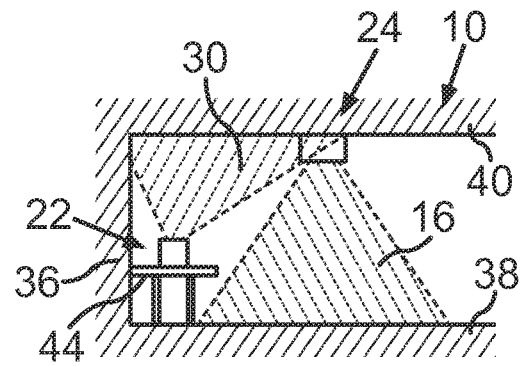

FIG. 4 shows a schematic illustration as in FIG. 3, in which, however—in contrast to the embodiment according to FIG. 3—the communication base device 22 is arranged on a table 44 inside the room 10. The communication base device 22 is designed in the present case to emit light in the direction of the ceiling 40 of the room 10, wherein the communication base device 22, and the communication unit 26 here, are designed for a broad diverging light emission and a broad light reception. The installation of the communication device 12 is thus particularly simple and also tolerant with respect to arrangement, because accurate focusing of the communication base device 22 or its communication unit 26, respectively, on the light deflection unit 24 is not necessary, in contrast to the embodiment according to FIG. 3. At the same time, the high level of utilization of the light provision cannot be achieved as in the embodiment according to FIG. 3.

Figure 5:
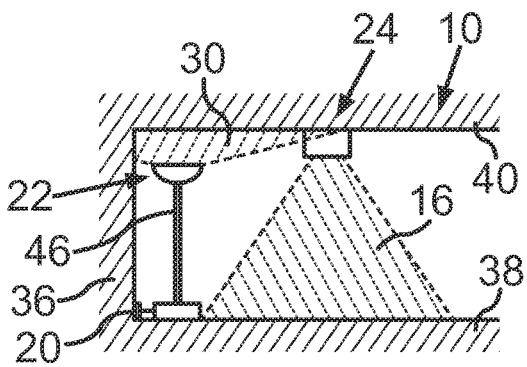

FIG. 5 shows a further embodiment of a communication device 12, which is based on the embodiment according to FIG. 4. In contrast to the embodiment according to FIG. 4, the communication base device 22 is arranged on an upright pillar 46 here. A broad diverging emission/reception range is also provided here, so that a simple setup and/or implementation of the communication device 12 can be achieved. A connection to the communication network 20 is shown in a base region of the pillar 46. The connection is simultaneously also used for the power supply of the communication base device 22.

Figure 6:
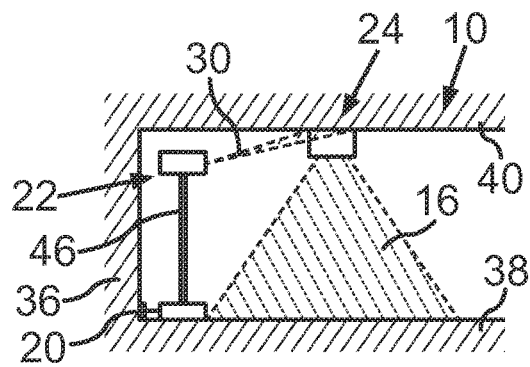

FIG. 6 shows a combination of the embodiments according to FIG. 3 in FIG. 5, in which the communication base device 22 is also arranged on the pillar 46, wherein here, however—in contrast to the embodiment according to FIG. 5—focusing of the light-based communication link 30 on the light deflection unit 24 is provided, as has already been explained on the basis of the embodiment according to FIG. 3.

Figure 7:
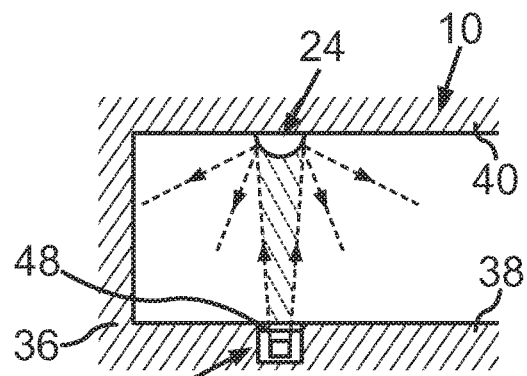

FIG. 7 shows a further embodiment of a communication device 12, in which the communication base device 22 is arranged centrally in the floor 38 of the room 10, for example, like a floor tank. The light emission or the light reception, respectively, takes place through a transparent pane 48 in the floor 38. The light deflection unit 24, which is formed in the present case like the convex mirror, as has already been explained on the basis of FIG. 1, is arranged opposite to the communication base device 22 on the ceiling 40 of the room 10. A very large predeterminable region 16 can be achieved in this way.

Figure 8:
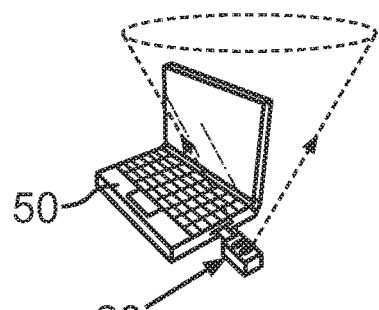

FIG. 8 shows a further embodiment of a communication base device 22, which is formed in the present case by a USB stick, which is connected to a laptop 50. The laptop 50 can be arranged on a table 44 in the room 10, as shown in FIG. 4. The USB stick is designed to emit light in the direction of the ceiling 40 or receive light therefrom, respectively, in operation as intended. The communication base device 22 is thus designed having a correspondingly strongly diverging light emission or a correspondingly broadly formed reception range, respectively. A local "hotspot" can be provided in this manner. The laptop 50 may be furthermore connected to a communication network (not shown).

Figure 9:
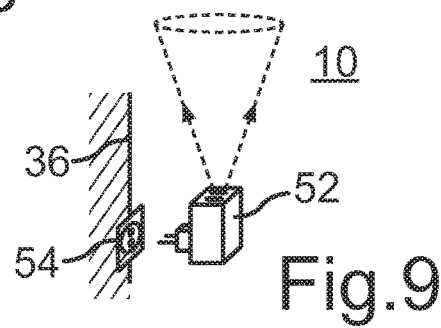

FIG. 9 shows a further embodiment of a communication base device 22, which is based on the embodiment according to FIG. 8. It is provided in the present case that the communication base device 22 is arranged in a housing 52, which can be plugged like a plug assembly into a wall-side plug connection 54 or socket, to establish the wired communication link to the communication network 20 and provide a power supply for the communication base device 22 at the same time. It is also provided here that the light emission takes place in the direction of the ceiling 40 of the room 10. Reference is accordingly made to the preceding exemplary embodiments.

Figure 10:
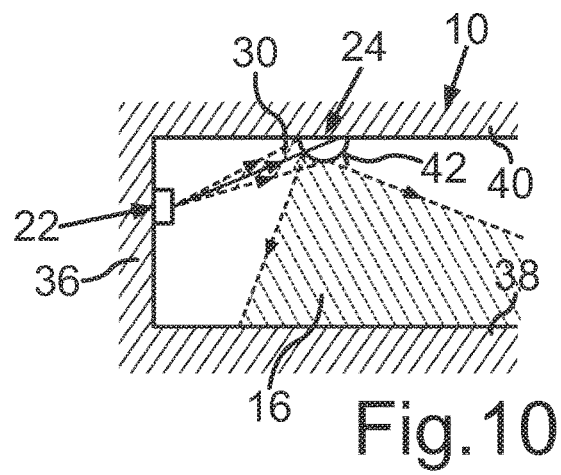
Figure 11:
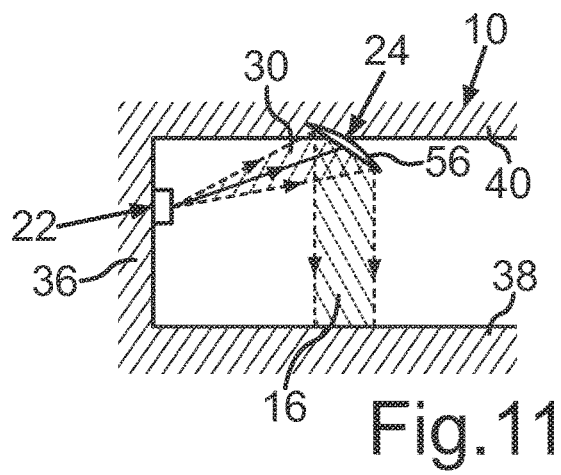
Figure 12:
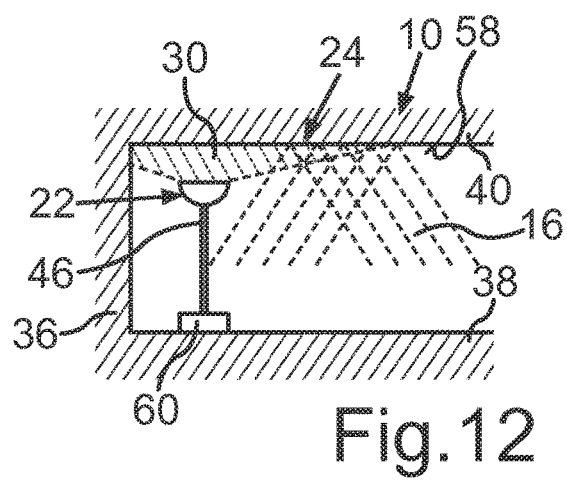

FIGS. 10 to 12 relate to different embodiments of light deflection units 24. FIG. 10 thus shows the embodiment of a light deflection unit 24 having a light deflection element like a convex mirror 42. Reference is additionally made in this regard to the statements according to FIG. 1.

FIG. 11, in contrast, shows a light deflection unit 24, which includes a concave mirror 56 as a reflector element. The concave mirror 56 is fastened inclined on the ceiling in a predeterminable manner, so that the predeterminable region 16 can be reached.

FIG. 12 shows a further embodiment of a light deflection unit 24, which is formed in the present case by a coating 58, which is arranged on the ceiling 40 of the room 10. The coating is a reflective coating with respect to the light of the light-based communication link 30. In the present case, this light deflection unit 24 is operated using a communication base device 22 on the pillar 46, as has already been explained on the basis of FIG. 5. A particularly large predeterminable region 16 can be achieved by this embodiment.

Figure 13:
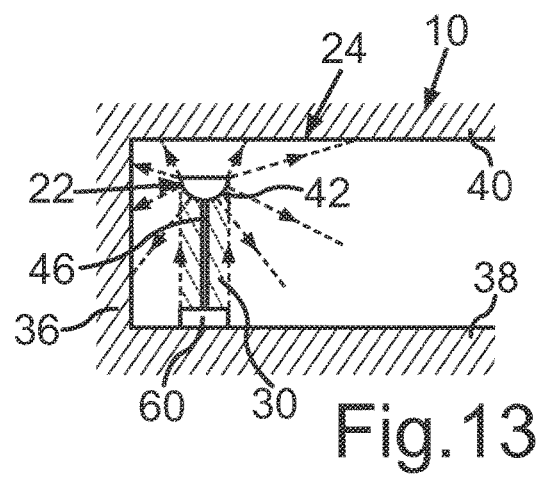

FIG. 13 shows a further embodiment, which is also suitable for simple retrofitting. In this embodiment, the light deflection unit 24 is arranged on a pillar 46, which includes a base 60, which is placed on the floor 38. The base 60 includes the communication base device 22, which is designed in the present case to emit light to the light deflection unit 24 or receive light therefrom, respectively, in parallel to the pillar 46. In the present case, the light deflection unit includes a reflector element which is formed as a convex mirror 42. A cap side of the convex mirror 42 is centrally connected to the pillar 46. A very large, spacious predeterminable region 16 can thus also be achieved.

Because the light deflection unit 24 and the communication base device 22 are combined to form a common structural unit, which can also be designed as portable and/or transportable, a particularly simple and cost-effective provision of the wireless communication link 14 can be achieved. The base 60 provides the corresponding connection options for the communication base device 22, so that the communication base device 22 can be coupled with respect to communication in the above-described manner to the communication network 20. A power coupling can also be provided here, which can be used for the power supply of the communication base device 22.

Figure 14:
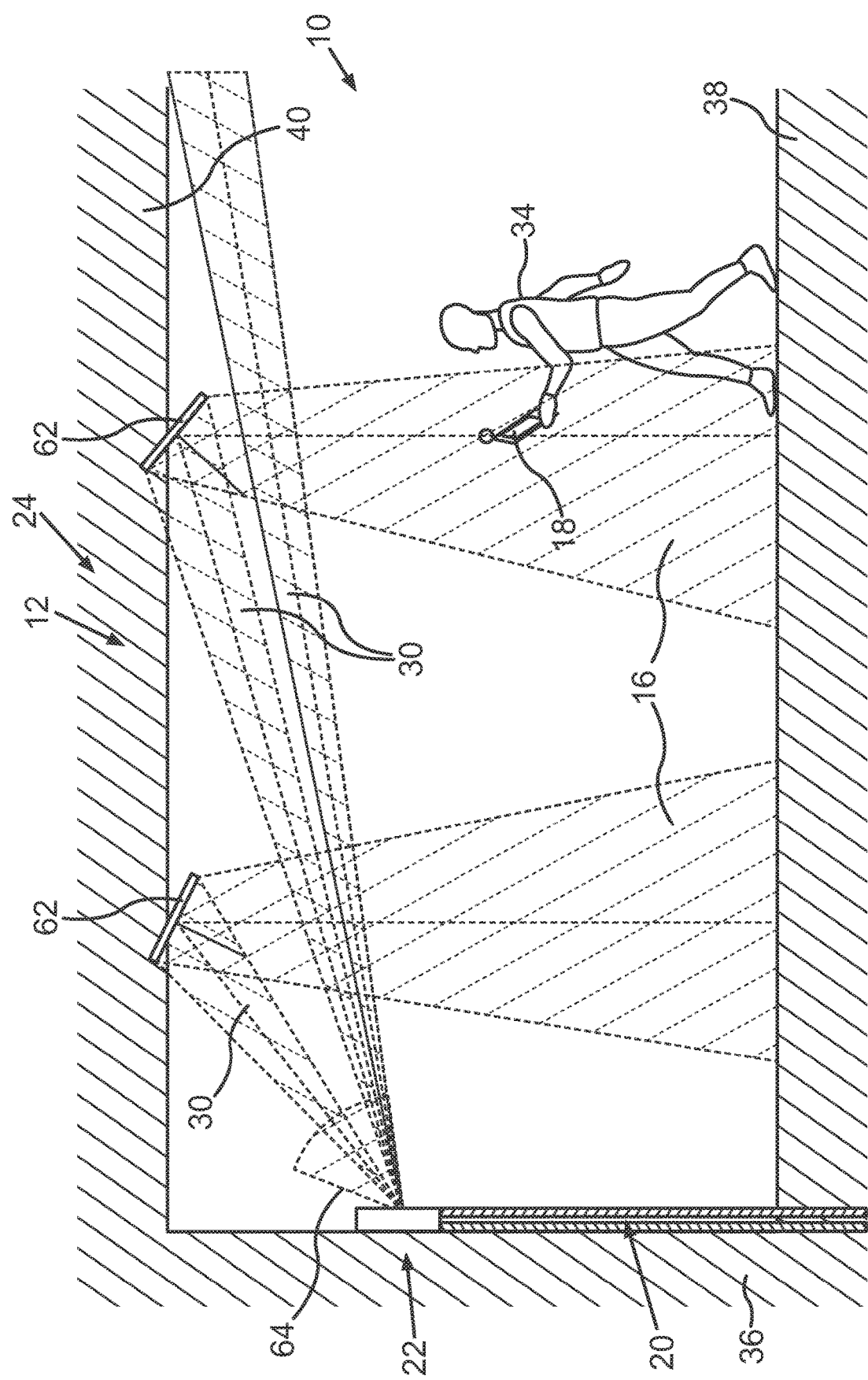
FIG. 14 shows a schematic illustration as in FIG. 1 having multiple light deflection units based on the embodiment according to FIG. 11.

FIG. 14 shows a further embodiment of a communication device 12, which is also arranged inside the room 10. The illustration according to FIG. 14 is based on the illustration according to FIG. 1, because of which reference is additionally made to the statements in this regard, e.g. with respect to the communication base device 22 and its connection to the communication network 20. The embodiment according to FIG. 14 differs from the embodiment according to FIG. 1 in that the light deflection unit 24 includes two flat mirrors 62 arranged on the ceiling 40 in the present case, which are connected to the ceiling 40 inclined in a predeterminable manner. The predeterminable regions 16 illustrated in FIG. 14 can thus be provided.

The predeterminable regions 16 are not directly connected to one another in this embodiment, specifically because of the properties of the light deflection unit 24, because the flat mirrors as reflector elements are accordingly arranged spaced far apart from one another on the ceiling 40. This embodiment is therefore suitable for the case in which communication is desired in predeterminable areas, for example, in a lecture hall or the like. If the subareas of the predeterminable region 16 are to be connected to one another, the flat mirrors 62 are accordingly to be fastened close to one another on the ceiling 40. In an alternative embodiment, the mirrors 62 can also be designed as concave mirrors.

Figure 15:
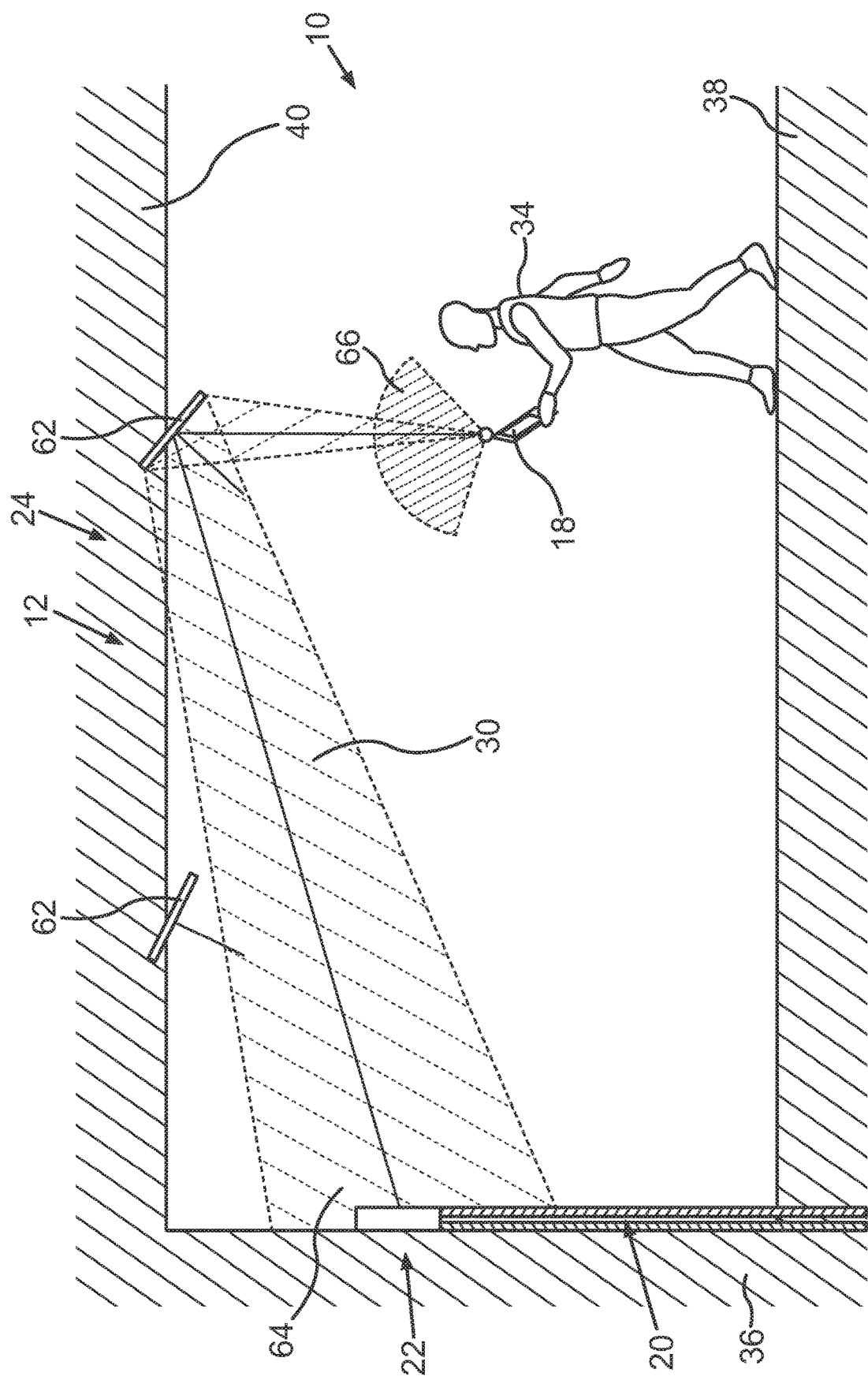
FIG. 15 shows an illustration as in FIG. 2 for the embodiment according to FIG. 14.

FIG. 15 shows the conditions for the case of the light-based data transmission from the communication terminal device 18 of the user 34 to the communication base device 22 for the embodiment based on FIG. 14. It can be seen that the communication link 30 only takes place via the one of the mirrors 62, in the assigned subarea of which of the predeterminable region 16 the communication terminal device 18 is positioned.

Figure 16:
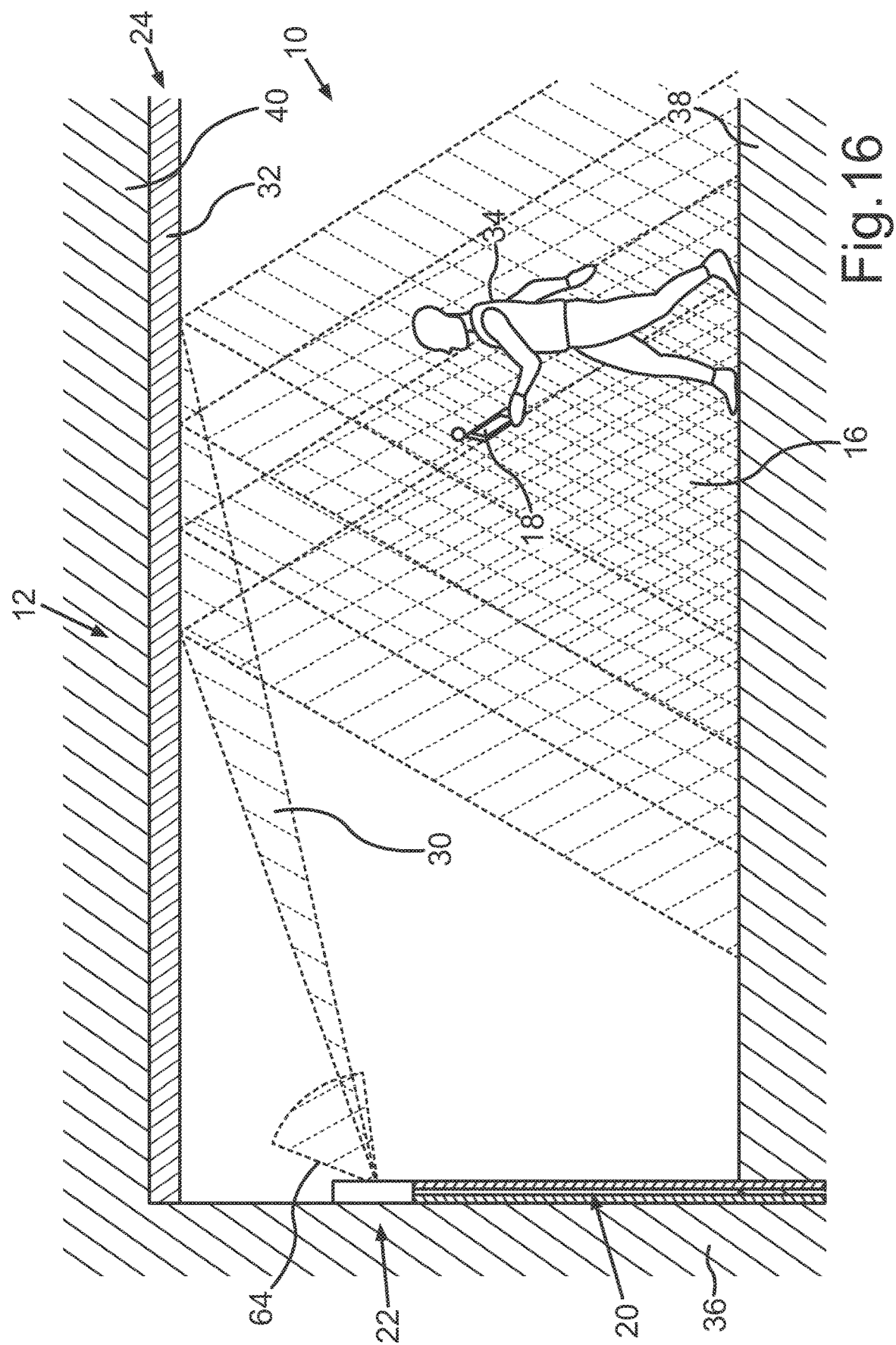
FIG. 16 shows a schematic illustration of a further embodiment of a communication device as in FIG. 1 having a light deflection unit according to FIG. 12.
Figure 17:
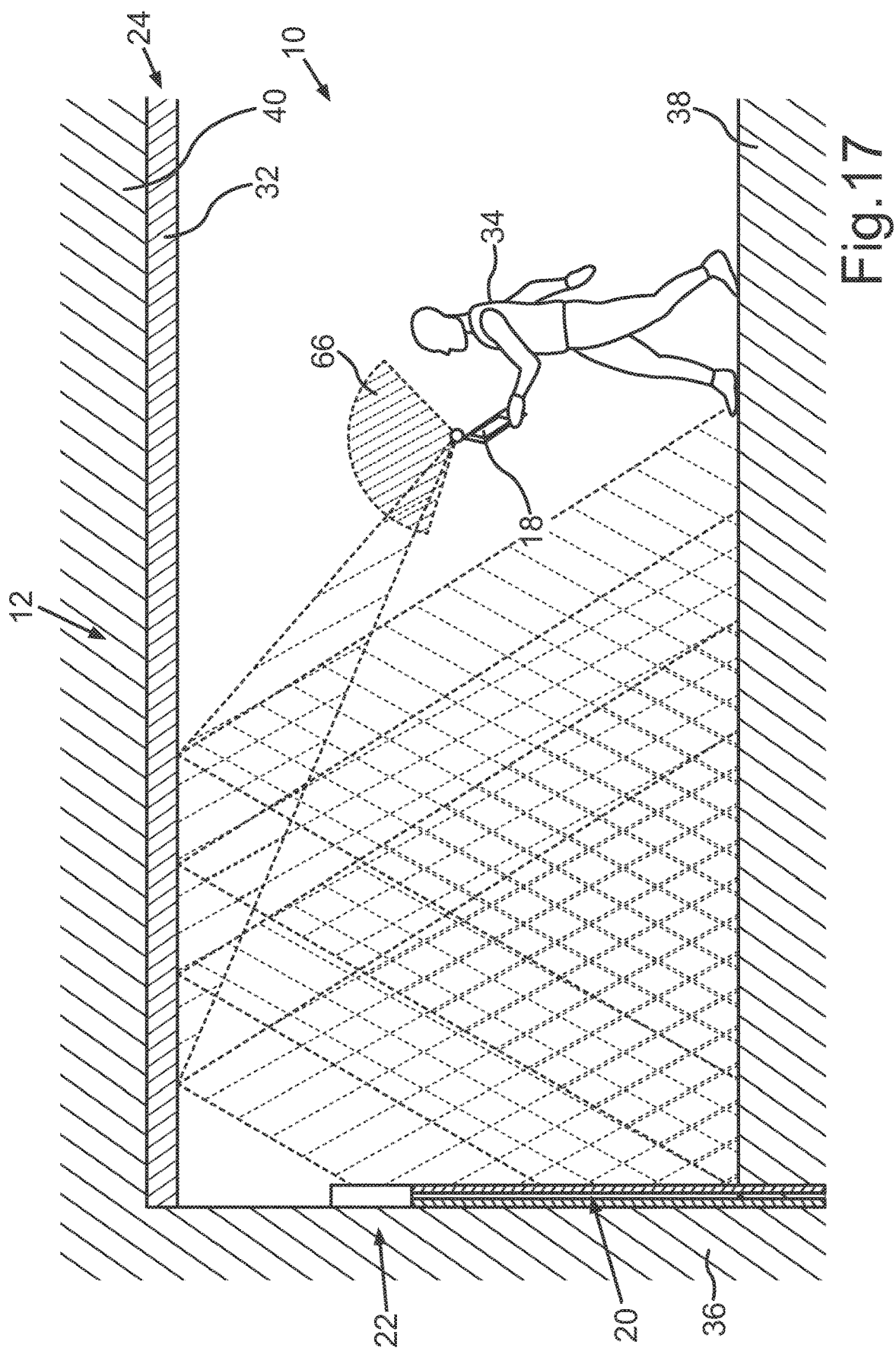
FIG. 17 shows a schematic illustration as in FIG. 2 for the communication device according to FIG. 16.

FIG. 16 shows a further embodiment of a communication device 12, which is based on the embodiment according to FIG. 14. In contrast to the embodiment according to FIG. 14, the light deflection unit 24 is not formed by reflector elements like flat mirrors here, but rather instead by a coating 32 on the ceiling 40, which has reflective and/or scattering properties, whereby a larger predeterminable region 16 can be achieved. The light deflection unit corresponds to that which has already been explained on the basis of FIG. 12, because of which reference is additionally made to the statements in this regard. This embodiment has the advantage that the predeterminable region 16 is very large and thus a positioning of the communication terminal device 18 can also be changed in broad ranges during the communication. FIG. 17 shows the corresponding conditions when the communication terminal device 18 emits light to the communication base device 22.

In the figures, e.g. FIGS. 14 to 17, 64 and 66 represent emission-reception areas of the communication device 22 or of its communication unit 26, respectively, and of the communication terminal device 18. The emission-reception areas may include a predeterminable, for example, also settable spatial angle.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes that come within the meaning and range of equivalency of the claims are therefore intended to be embraced.

LIST OF REFERENCE SIGNS 10 room
12 communication device
14 communication link
16 predeterminable region
18 communication terminal device
20 communication network
22 communication base device
24 light deflection unit
26 communication unit
28 converter unit
30 communication link
32 coating
34 user
36 side wall
38 floor
40 ceiling
42 mirror
44 table
46 pillar
48 pane
50 laptop
52 housing
54 plug connection
56 mirror
58 coating

The invention claimed is:

1. A communication base device for a communication device for providing a wireless communication link between at least one communication terminal device positioned in a predeterminable region and a communication network, wherein the communication base device is configured to be fixedly arranged, wherein the communication base device comprises:
  a network communication for connecting the communication base device to the communication network;
  a light-based communication unit for providing a wireless light-based communication link to a light deflection unit configured to deflect light from the communication base device to the predeterminable region; wherein the light-based communication unit is configured to focus the emitted light onto the predeterminable region; and wherein the light-based communication unit is configured to emit the light in multiple light frequency ranges different from one another and to focus the light of a respective light frequency range onto an assigned one of multiple subareas of the predeterminable region; and
  a converter unit for the communication coupling of the communication unit to the network connection.

2. The communication base device as claimed in claim 1, wherein the communication unit is configured to emit and/or receive light in a predetermined light frequency range individually assigned to the communication terminal device.

3. The communication base device as claimed in claim 1, wherein the communication unit comprises an optical emitter element configured to emit the light in an oriented manner to provide the wireless communication link.

4. The communication base device as claimed in claim 1, wherein the communication unit is configured to orient the optical emitter element and/or an optical receiver element of the communication unit onto the light deflection unit.

5. The communication base device as claimed in claim 1, wherein the communication unit is configured to provide a respective independent individual communication channel for each of a predetermined plurality of communication terminal devices.

6. The communication base device as claimed in claim 5, wherein each communication channel comprises a predeterminable light frequency range and/or the communication unit is configured to emit the light into predeterminable subareas of the predeterminable region.

7. The communication base device as claimed in claim 1, wherein the light deflection unit comprises at least one spectral filter element.

8. A communication device for providing a wireless communication link between at least one communication terminal device positioned in a predeterminable region and a communication network,
   at least one fixedly arranged communication base device as claimed in claim 1, and
   at least one light deflection unit for deflecting light between the at least one communication base device and the predeterminable region, wherein the light deflection unit is in a fixed positional relationship to the communication base device.

9. The communication base device as claimed in claim 8, wherein the light deflection unit comprises an orientation unit, so that the light deflection unit is oriented in such a way that the light is deflected into the predetermined region.

10. The communication base device as claimed in claim 8, wherein the light deflection unit comprises at least one reflector element.

11. The communication base device as claimed in claim 10, wherein the at least one reflector element is integrally formed with a delimitation wall of a room, which at least partially comprises the predeterminable region.

12. A method for providing a wireless communication link between at least one communication terminal device positioned in a predeterminable region and a communication network, in which a communication base device is fixedly arranged, comprising:
   connecting the communication base device to the communication network;
   arranging a light deflection unit deflecting light between the communication base device and the predeterminable region, wherein the light deflection unit is in a fixed positional relationship to the communication base device;
   providing a wireless light-based communication link between a light-based communication unit of the communication base device and the light deflection unit;
   wherein the light-based communication unit is configured to focus the emitted light onto the predeterminable region; and wherein the light-based communication unit is configured to emit the light in multiple light frequency ranges different from one another and to focus the light of a respective light frequency range onto an assigned one of multiple subareas of the predeterminable region; and
   coupling the communication unit to the communication network with respect to communication.

13. A method for establishing a wireless communication link between a communication network and a communication terminal device positioned in a predeterminable region, wherein the method comprises:
   establishing a wired communication link to the communication network via a fixedly arranged communication base device; and
   establishing a light-based communication link via a light deflection unit to the communication terminal device, wherein the light deflection unit is in a fixed positional relationship to the communication base device and deflects light between the communication base device and the predeterminable region;
   focusing the emitted light onto the predeterminable region; and wherein the emitted light is emitted in multiple light frequency ranges different from one another; and
   focusing the light of a respective light frequency range onto an assigned one of multiple subareas of the predeterminable region.

* * * * *